United States Patent
Coons

(10) Patent No.: US 8,019,522 B2
(45) Date of Patent: Sep. 13, 2011

(54) METHOD AND SYSTEM FOR PROVIDING COOLING AND POWER

(75) Inventor: Terry L. Coons, Troy, OH (US)

(73) Assignee: General Electric Company, Schenectady, NY (US)

( * ) Notice: Subject to any disclaimer, the term of this patent is extended or adjusted under 35 U.S.C. 154(b) by 548 days.

(21) Appl. No.: 12/241,330

(22) Filed: Sep. 30, 2008

(65) Prior Publication Data

US 2010/0082217 A1    Apr. 1, 2010

(51) Int. Cl.
*F02C 7/00* (2006.01)
*B64D 13/00* (2006.01)
(52) U.S. Cl. ..................... 701/100; 60/39.183
(58) Field of Classification Search .......... None
See application file for complete search history.

(56) References Cited

U.S. PATENT DOCUMENTS

| | | | |
|---|---|---|---|
| 4,514,976 A | 5/1985 | Christoff | |
| 4,732,324 A | 3/1988 | Nightingale | |
| 5,442,905 A * | 8/1995 | Claeys et al. | 60/785 |
| 5,600,965 A | 2/1997 | Jan et al. | |
| 5,899,085 A | 5/1999 | Williams | |
| 6,408,641 B1 | 6/2002 | Skur, III | |
| 6,545,373 B1 | 4/2003 | Andres et al. | |
| 6,546,736 B2 * | 4/2003 | Rakhmailov | 60/773 |
| 6,608,418 B2 | 8/2003 | Andres et al. | |
| 6,662,575 B2 | 12/2003 | Clarke | |
| 6,779,967 B2 | 8/2004 | Friedl et al. | |
| 6,845,630 B2 | 1/2005 | Bruno et al. | |
| 6,928,832 B2 * | 8/2005 | Lents et al. | 62/401 |
| 2007/0266695 A1 * | 11/2007 | Lui et al. | 60/204 |

FOREIGN PATENT DOCUMENTS

WO    WO 98/48162    * 10/1998

* cited by examiner

*Primary Examiner* — Michael J. Zanelli
(74) *Attorney, Agent, or Firm* — David J. Clement, Esq.; Armstrong Teasdale LLP

(57) ABSTRACT

A method for providing cooling and power is provided. The method includes providing a cooling unit that includes a first turbine rotatably coupled to a generator by a first shaft and providing a power unit that includes a second turbine rotatably coupled to a compressor by a second shaft. The method further includes coupling the power unit in flow communication with the cooling unit to form a turbine assembly, wherein the first shaft and the second shaft are independently rotatable relative to one another.

20 Claims, 2 Drawing Sheets

METHOD AND SYSTEM FOR PROVIDING COOLING AND POWER

BACKGROUND OF THE INVENTION

The field of this disclosure relates generally to a method and a system for providing cooling and power and, more particularly, to an integrated cooling and power system for an aircraft.

Many known aircraft cooling and power systems require bleed air from a propelling engine of the aircraft to drive numerous independent subsystems that provide either cooling or power to the aircraft. However, the use of bleed air decreases engine efficiency by increasing engine fuel consumption and loading. Additionally, the use of multiple independent subsystems adds weight and volume to the aircraft, which also results in increased fuel consumption.

As such, an integrated system that provides both cooling and power to an aircraft without extensive use of bleed air from the propelling engine would be beneficial to increase engine efficiency and reduce fuel consumption.

BRIEF DESCRIPTION OF THE INVENTION

In one aspect, a method for providing cooling and power is provided. The method includes providing a cooling unit that includes a first turbine rotatably coupled to a generator by a first shaft and providing a power unit that includes a second turbine rotatably coupled to a compressor by a second shaft. The method further includes coupling the power unit in flow communication with the cooling unit to form a turbine assembly, wherein the first shaft and the second shaft are independently rotatable relative to one another.

In another aspect, a system for providing cooling and power is provided. The system includes a turbine assembly that includes a cooling unit including a first turbine rotatably coupled to a generator by a first shaft. The system further includes a power unit including a second turbine rotatably coupled to a compressor by a second shaft. The power unit is coupled in flow communication with the cooling unit such that the first shaft and the second shaft are independently rotatable relative to one another.

DETAILED DESCRIPTION OF THE INVENTION

The following detailed description illustrates an exemplary cooling and power system by way of example and not by way of limitation. The description enables one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, a cooling and power system for use on an aircraft. However, it is contemplated that this disclosure has general application to providing cooling and power in a broad range of systems and in a variety of industrial and/or consumer applications. As used herein, the term "air" refers to any gas or combination of gases and is not limited to the combination of Earth's atmospheric gases commonly referred to as "air."

Figure 1:
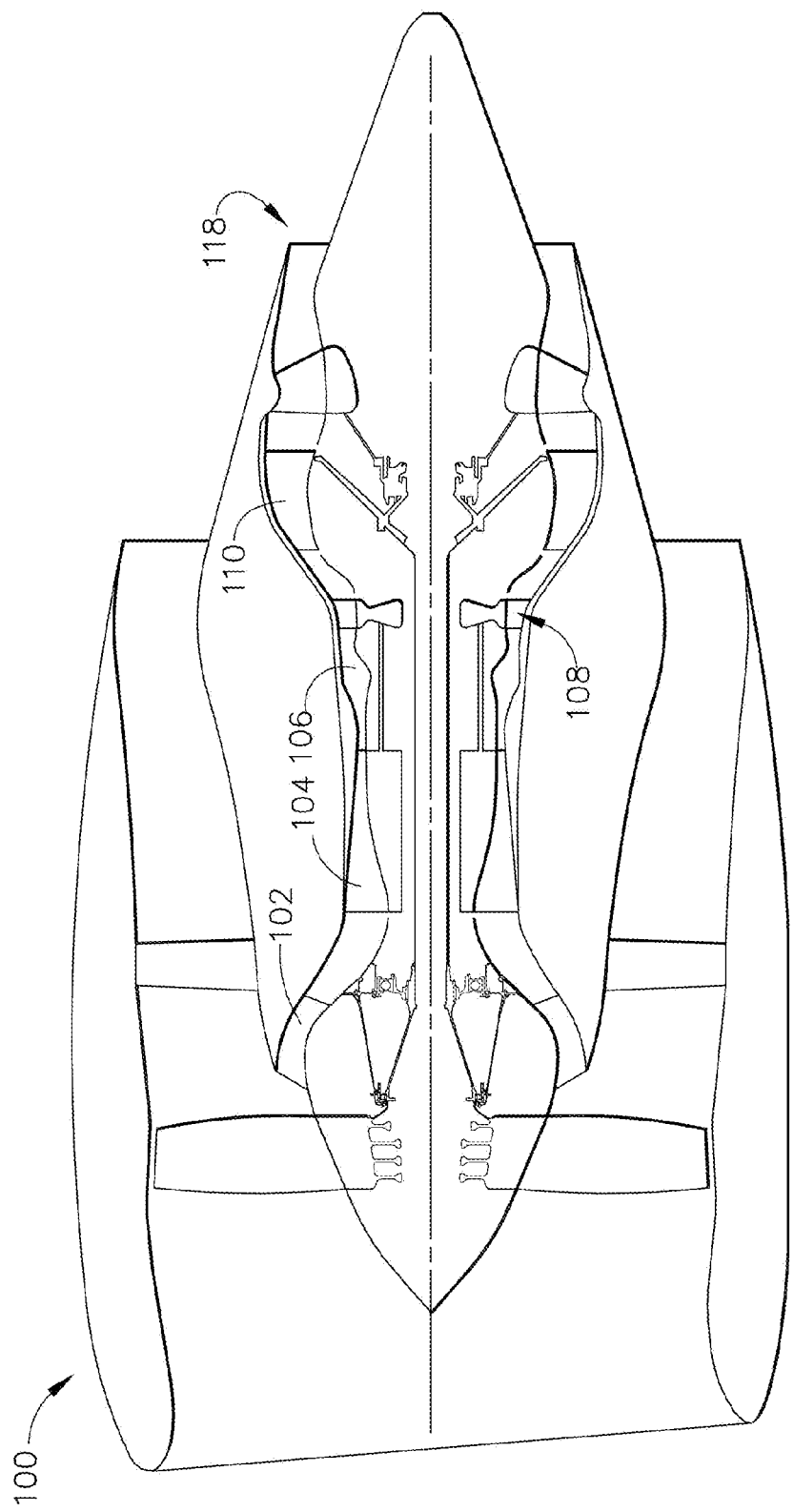
FIG. 1 is a schematic view of gas turbine engine.

FIG. 1 is a schematic view of an exemplary core engine 100 (i.e., a gas turbine engine) for use in propelling an aircraft. Core engine includes a fan assembly 102, a high pressure compressor 104, and a combustor 106. Core engine 100 also includes a high pressure turbine 108 and a low pressure turbine 110. In operation, air flows through fan assembly 102 and compressed air is supplied from fan assembly 102 to high pressure compressor 104. The highly compressed air is delivered to combustor 106. Airflow from combustor 106 drives rotating turbines 108 and 110 and exits core engine 100 through an exhaust system 118. In the exemplary embodiment, core engine 100 (e.g., high pressure compressor 104) is coupled in flow communication with an integrated cooling and power system 200 (shown in FIG. 2), as described below.

Figure 2:
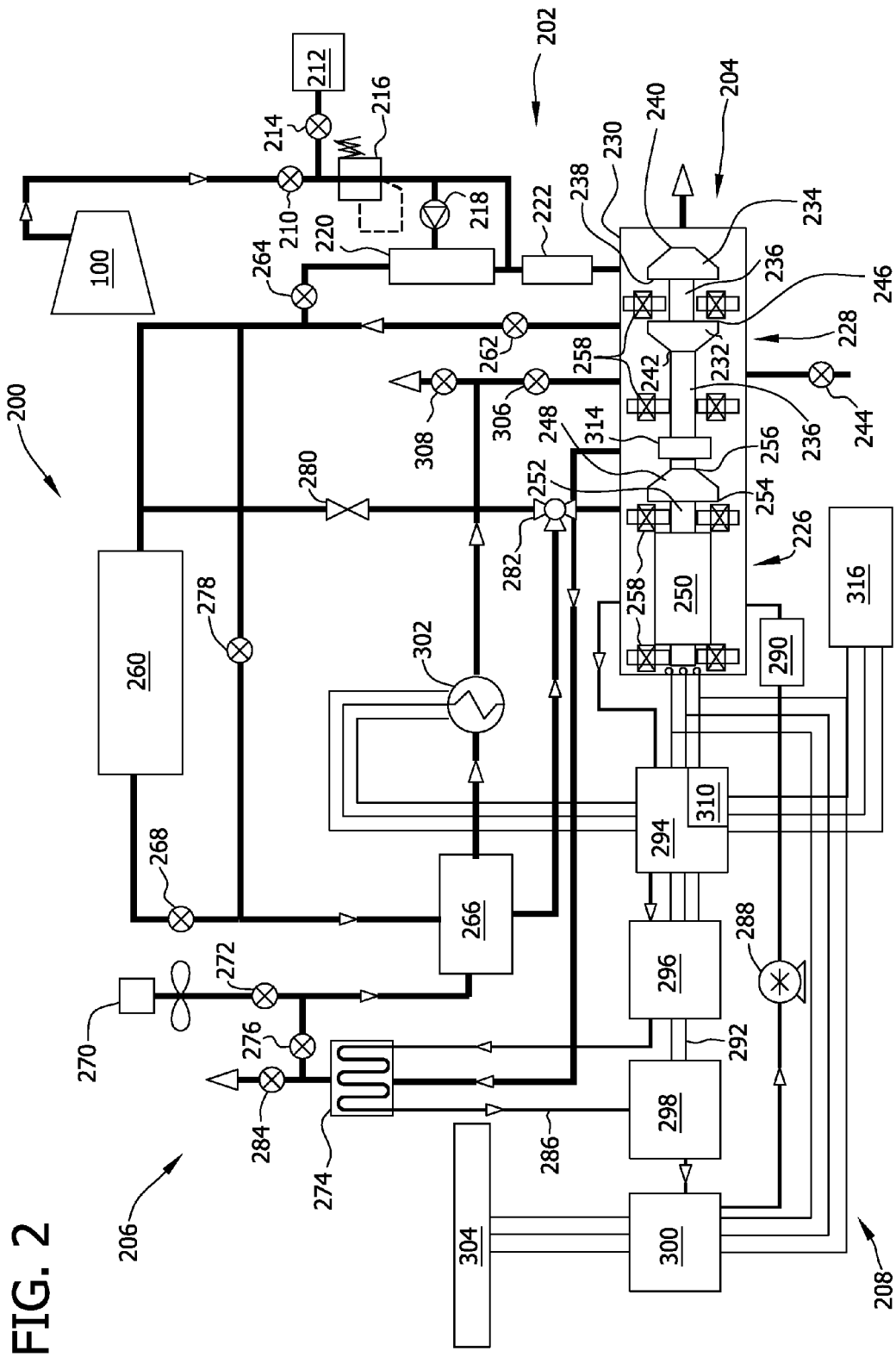
FIG. 2 is a schematic flow diagram of a cooling and power system for use with the gas turbine engine shown in FIG. 1.

FIG. 2 is a schematic flow diagram of cooling and power system 200. System 200 includes a starter assembly 202, a turbine assembly 204, a cooling assembly 206, and an electrical assembly 208. Starter assembly 202 is coupled in flow communication between core engine 100 and turbine assembly 204 across a first supply valve 210 and/or between a compressed air source 212 and turbine assembly 204 across a second supply valve 214. In the exemplary embodiment, compressed air source 212 is a pneumatic pressure vessel (e.g., an air tank mounted on a transportable cart). Alternatively, compressed air source 212 may be any suitable source of compressed air that enables system 200 to function as described herein. In the exemplary embodiment, first supply valve 210 and second supply valve 214 are "on/off" valves (i.e., ball valves) that facilitate permitting compressed air to flow from core engine 100 and/or compressed air source 212, respectively, towards starter assembly 202.

In the exemplary embodiment, starter assembly 202 includes a pressure control device 216, a directional flow valve 218, a combustor 220, and a mass flow control device 222 that are sequentially coupled in flow communication with one another along a flow path from core engine 100 and/or compressed air source 212 to turbine assembly 204. In one embodiment, pressure control device 216 is a pneumatic pressure valve that facilitates regulating a pressure of a compressed airflow. In one embodiment, directional flow valve 218 is a check valve that facilitates permitting airflow in only one direction (i.e., from first supply valve 210 and/or second supply valve 214 towards turbine assembly 204). In one embodiment, combustor 220 includes a fuel injector (not shown) and a combustion chamber (not shown) that facilitate mixing a fuel (i.e., propane, natural gas, etc.) with a compressed airflow from core engine 100 and/or compressed air source 212 and igniting the mixture to induce a flow of hot combustion gases towards turbine assembly 204. In one embodiment, mass flow control device 222 includes a variable area flow nozzle that facilitates regulating a quantity of airflow from combustor 220 and/or pressure control device 216 towards turbine assembly 204. Alternatively, pressure control device 216, directional flow valve 218, combustor 220, and/or mass flow control device 222 may be any suitable devices that enable starter assembly 202 to function as described herein.

In the exemplary embodiment, turbine assembly 204 includes a cooling unit 226 and a power unit 228 that are mounted within a housing 230. Power unit 228 includes a compressor 232 rotatably coupled to a power turbine 234 by a first shaft 236 (i.e., a turbo-compressor). Power turbine 234 includes an inlet 238 coupled in flow communication with combustor 220, and an outlet 240 coupled in flow communication with the ambient. Compressor 232 includes and inlet 242 coupled in flow communication with cooling assembly 206 and/or the ambient across a first inlet valve 244, and an outlet 246 coupled in flow communication with cooling assembly 206. Cooling unit 226 includes a cooling turbine 248 rotatably coupled to a generator 250 (e.g., a permanent magnet generator) by a second shaft 252 (i.e., a turbo-generator). Cooling turbine 248 includes an inlet 254 and an outlet 256 that are coupled in flow communication with cooling assembly 206.

In the exemplary embodiment, first shaft 236 and/or second shaft 252 are rotatably supported by magnetic bearings 258, are axially aligned with one another, and/or are independently rotatable relative to one another such that power unit 228 is capable of being operated at a first speed while cooling unit 226 is operated at a second speed that is different than the first speed to facilitate simultaneously optimizing an operating efficiency of power unit 228 and an operating efficiency of cooling unit 226. In another embodiment, first shaft 236 and second shaft 252 may be oriented in any direction relative to one another and/or may be operated at the same speed.

In the exemplary embodiment, cooling assembly 206 includes a first heat exchanger 260 coupled in flow communication with turbine assembly 204 (i.e., compressor 232) across a variable pressure regulating valve 262 (VPRV) that controls a pressure of an airflow discharged from compressor 232. First heat exchanger 260 is a pre-cooling heat exchanger that lowers a temperature and maintains a pressure of a compressed airflow from VPRV 262. In one embodiment, first heat exchanger 260 is a ram duct heat exchanger (i.e., an "air-to-air" heat exchanger) that utilizes air extracted from the ambient to lower a temperature of a compressed airflow discharged from VPRV 262. In another embodiment, first heat exchanger 260 is a fan duct heat exchanger (i.e., an "air-to-air" heat exchanger) that utilizes ambient air extracted from high pressure compressor 104 within core engine 100 (shown in FIG. 1) to lower a temperature of a compressed airflow discharged from VPRV 262. In one embodiment, VPRV 262 is coupled to combustor 220 across a first bypass valve 264 that redirects a compressed airflow from VPRV 262 back through combustor 220.

In the exemplary embodiment, cooling assembly 206 also includes a second heat exchanger 266 coupled in flow communication with first heat exchanger 260 across a second bypass valve 268. Second heat exchanger 266 is a pre-cooling heat exchanger that lowers a temperature and maintains a pressure of a compressed airflow from first heat exchanger 260. In one embodiment, second heat exchanger 266 is a recuperative heat exchanger (i.e., an "air-to-air" heat exchanger) that utilizes a flow of ambient air from an air input device 270 across a second inlet valve 272 and/or a flow of cooling air from a third heat exchanger 274 across a third bypass valve 276 to lower a temperature of a compressed airflow from first heat exchanger 260. In another embodiment, second heat exchanger 266 is coupled in direct flow communication with VPRV 262 across a fourth bypass valve 278 to direct a compressed airflow from VPRV 262 directly to second heat exchanger 266. In an alternative embodiment, VPRV 262 is coupled directly to cooling unit 226 across a fifth bypass valve 280 and a mixing valve 282 to selectively permit a quantity of compressed air to bypass first heat exchanger 260 and second heat exchanger 266 to increase a temperature of the compressed air flowing into cooling turbine 248 (i.e., to facilitate preventing third heat exchanger 274 from freezing).

In the exemplary embodiment, third heat exchanger 274 is coupled in flow communication between turbine assembly 204 (i.e., cooling turbine outlet 256) and second heat exchanger 266 across third bypass valve 276 and/or between turbine assembly 204 and the ambient across a first discharge valve 284. Third heat exchanger 274 is a "liquid-to-air" heat exchanger (e.g., a polyalphaolephin (PAO) heat exchanger) that uses an airflow from cooling turbine 248 to lower a temperature of a liquid flowing through a cooling circuit 286, at least a portion of which runs through third heat exchanger 274. Alternatively, cooling circuit 286 may have a gas flowing therethrough, and third heat exchanger 274 may be an "air-to-air" heat exchanger. In one embodiment, a portion of cooling circuit 286 is positioned proximate electrical assembly 208 to facilitate a transfer of thermal energy from electrical assembly 208 to the liquid. In another embodiment, cooling circuit 286 includes a pump 288 and a reservoir 290 for use in circulating the liquid through cooling circuit 286 (i.e., through third heat exchanger 274).

In the exemplary embodiment, electrical assembly 208 is electrically coupled to generator 250 via wiring 292. In one embodiment, electrical assembly 208 includes a system controller 294, a power conditioner 296, at least one avionics device 298 (e.g., a radar), a power converter 300, and a resistive heater 302. Power conditioner 296 is an electrical device that conditions an output of generator 250 to meet a predetermined electrical requirement of a component to be powered by generator 250, and power converter 300 is an electrical device that diverts a quantity of power from generator 250 to an aircraft bus 304. In one embodiment, power conditioner 296 and/or power converter 300 may include a device that converts alternating current (AC) output from generator 250 to direct current (DC). In one embodiment, power conditioner 296 and/or power converter 300 converts a 3-phase AC power from generator 250 to Mil-STD-704D/E regulated power at 115 Vrms @ 400 Hz., for example.

In the exemplary embodiment, resistive heater 302 is positioned along a flow path from second heat exchanger 266 to turbine assembly 204 (i.e., cooling turbine inlet 254). In one embodiment, resistive heater 302 is a trim load module (TLM) that converts power from generator 250 into thermal energy to maintain a rotational speed of generator 250 (i.e., TLM dissipates, in the form of thermal energy, a quantity of power from generator 250 that exceeds a requirement of electrical assembly 208 to facilitate providing a constant load to generator 250) by transferring thermal energy to the cooling airflow from third heat exchanger 274 towards turbine assembly 204 (i.e., towards compressor inlet 242) across a second discharge valve 306 and/or into the ambient across a third discharge valve 308.

In the exemplary embodiment, system controller 294 may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. As used herein, the term "processor" is not limited to only integrated circuits referred to in the art as a processor, but broadly refers to a computer, a microcontroller, a microcomputer, a programmable logic controller, an application specific integrated circuit and any other programmable circuit. Moreover, system controller 294 may be a microprocessor that includes read-only memory (ROM) and/or random access memory (RAM), such as, for example, a 32 bit microcomputer with 2 Mbit ROM, and 64 Kbit RAM. In the exemplary embodiment, system controller 294 communicates (i.e., receives signals from and/or transmits signals to) a memory 310, a plurality of sensors positioned throughout system 200, and/or a variety of other devices located within system 200 (e.g., an onboard computer) and/or remotely from system 200 (e.g., a flight controller).

In a first operating mode of core engine 100, a sufficient quantity of compressed air is extractable from core engine 100 to start system 200 without substantially lowering an operating efficiency characteristic of core engine 100 (e.g., when the aircraft is cruising). In the first operating mode, system 200 is started by opening first supply valve 210 to permit a predetermined quantity of compressed air to flow from core engine 100 (e.g., from high pressure compressor 104), through pressure control device 216, through directional flow valve 218, and into combustor 220. Combustor 220 mixes the compressed air with fuel and ignites the mixture to generate a flow of combustion gases through mass flow control device 222 and through power turbine inlet 238. The combustion gases drive power turbine 234 and are subsequently exhausted into the ambient through power turbine outlet 240. Power turbine 234 rotates first shaft 236 and drives compressor 232. While compressor 232 is being driven by power turbine 234, first inlet valve 244 is opened such that compressor 232 draws a predetermined quantity of ambient air therethrough. First inlet valve 244 is subsequently closed.

Compressor 232 compresses the ambient air from first inlet valve 244 and discharges a compressed airflow towards VPRV 262 through compressor outlet 246. A first portion of the compressed airflow from VPRV 262 is directed through first heat exchanger 260, through second heat exchanger 266, and into cooling turbine 248 to facilitate rotating second shaft 252 and driving generator 250. A second portion of the compressed airflow from VPRV 262 is directed across first bypass valve 264 and back through combustor 220. After the second portion of compressed air flows through combustor 220, first supply valve 210 is closed, and system 200 becomes a closed-loop system.

In one embodiment, the compressed airflow from second heat exchanger 266 is directed through mixing valve 282 and into cooling turbine 248. A temperature and a pressure of the compressed air flowing into cooling turbine 248 are lowered across cooling turbine 248, and a cooling airflow is discharged from cooling turbine 248 towards third heat exchanger 274. Mixing valve 282 mixes the compressed airflow from second heat exchanger 266 with a compressed airflow across fifth bypass valve 280 to raise a temperature of the compressed airflow directed into cooling turbine 248 such that a temperature of the cooling air discharged from cooling turbine 248 is facilitated to be regulated. Third heat exchanger 274 uses the cooling airflow from cooling turbine 248 to lower a temperature of the liquid flowing through cooling circuit 286. The cooling air flowing through third heat exchanger 274 is directed towards second heat exchanger 266 for use in lowering a temperature of compressed air flowing from first heat exchanger 260 through second heat exchanger 266. The cooling air that flows through second heat exchanger 266 from third heat exchanger 274 is directed over resistive heater 302, into compressor inlet 242, and into cooling assembly 206 through compressor outlet 246 to be recycled through the closed-loop system.

In a second operating mode of core engine 100, a sufficient quantity of compressed air is not extractable from core engine 100 to start system 200 (e.g., when the aircraft is on the ground). In the second operating mode, system 200 is started by opening second supply valve 214 to permit a predetermined quantity of compressed air to flow from compressed air source 212, through pressure control device 216, through directional flow valve 218, and into combustor 220. Combustor 220 mixes the compressed air with fuel and ignites the mixture to generate a flow of combustion gases through mass flow control device 222 and through power turbine inlet 238. The combustion gases drive power turbine 234 and are subsequently exhausted into the ambient through power turbine outlet 240. Power turbine 234 rotates first shaft 236 and drives compressor 232. While compressor 232 is being driven by power turbine 234, first inlet valve 244 is opened such that compressor 232 draws a predetermined quantity of ambient air therethrough. First inlet valve 244 is subsequently closed.

Compressor 232 compresses the ambient air from first inlet valve 244 and discharges a compressed airflow towards VPRV 262 through compressor outlet 246. A first portion of the compressed airflow from VPRV 262 is directed through first heat exchanger 260, through second heat exchanger 266, and into cooling turbine 248 to facilitate rotating second shaft 252 and driving generator 250. A second portion of the compressed airflow from VPRV 262 is directed across first bypass valve 264 and back through combustor 220. After the second portion of compressed air flows through combustor 220, second supply valve 214 is closed, and system 200 becomes a closed-loop system.

In one embodiment, the compressed airflow from second heat exchanger 266 is directed through mixing valve 282 and into cooling turbine 248. A temperature and a pressure of the compressed air flowing into cooling turbine 248 are lowered across cooling turbine 248, and a cooling airflow is discharged from cooling turbine 248 towards third heat exchanger 274. Mixing valve 282 mixes the compressed airflow from second heat exchanger 266 with a compressed airflow across fifth bypass valve 280 to raise a temperature of the compressed airflow directed into cooling turbine 248 such that a temperature of the cooling air discharged from cooling turbine 248 is facilitated to be regulated. Third heat exchanger 274 uses the cooling airflow from cooling turbine 248 to lower a temperature of the liquid flowing through cooling circuit 286. The cooling air flowing through third heat exchanger 274 is directed towards second heat exchanger 266 for use in lowering a temperature of compressed air flowing from first heat exchanger 260 through second heat exchanger 266. The cooling air that flows through second heat exchanger 266 from third heat exchanger 274 is directed over resistive heater 302, into compressor inlet 242, and into cooling assembly 206 through compressor outlet 246 to be recycled through the closed-loop system.

In alternative embodiments, the compressed air from core engine 100 and/or compressed air source 212 may be directed into mass flow control device 222 by bypassing directional flow valve 218 and combustor 220. In other embodiments, the compressed air from compressor 232 may be directed to second heat exchanger 266 through fourth bypass valve 278, thereby bypassing first heat exchanger 260. In other embodiments, first discharge valve 284, third discharge valve 308, and second inlet valve 272 may be open, while third bypass valve 276 and second discharge valve 306 are closed, such that ambient air from air input device 270 is directed across second heat exchanger 266, over resistive heater 302, and into the ambient, and/or cooling air flowing through third heat exchanger 274 is exhausted into the ambient.

In another alternative embodiment, turbine assembly 204 may include a magnetic coupler 314 that is selectively operable to facilitate starting system 200 without using compressed air from core engine 100 and/or compressed air source 212. Specifically, when compressed air from core engine 100 and/or compressed air source 212 is unavailable or undesirable, magnetic coupler 314 is energized between first shaft 236 and second shaft 252 to rotatably couple first shaft 236 and second shaft 252 together. After magnetic coupler 314 is energized, generator 250 uses power from an external power source 316 and/or aircraft bus 304 to rotate first shaft 236 and second shaft 252, thereby operating as a motor to draw ambient air into compressor 232 for use in starting system 200.

In the exemplary embodiment, system controller 294 is programmed to perform the following tasks: (1) selectably releasing a compressed airflow from compressed air source 212 and/or core engine 100 to facilitate optimizing an efficiency characteristic of core engine 100; (2) regulating at least one operating characteristic of turbine assembly 204 (e.g., an operating speed of compressor 232 and/or power turbine 234 by throttling a flow of air through mass flow control device 222); (3) operating power unit 228 during non-operational periods of core engine 100 (e.g., operating power unit 228 when power is needed to perform a start operation of core engine 100 and/or when emergency power is needed to power a component of the aircraft); (4) diverting power from generator 250 to resistive heater 302 to facilitate providing a constant load to generator 250; and/or (5) performing system error detection and/or reporting to a main aircraft control system that is located on the aircraft and/or to a flight controller that is located remotely from the aircraft. Alternatively, system controller 294 may be programmed to facilitate any operation of system 200 described herein.

In one embodiment, system controller 294 controls an energy balance of system 200 by regulating a plurality of high-speed electric power switching circuits (not shown) within resistive heater 302 and/or by operating pressure control device 216 to supply a desired quantity of compressed air from core engine 100 to turbine assembly 204 at a desired pressure and/or temperature. In another embodiment, initial power for system 200 is taken from aircraft bus 304, and system controller 294 switches electric power from magnetic bearings 258, and/or other electric power requirements, from aircraft bus 304 to output power from generator 250 once system 200 reaches a stable state of operation (i.e., once the closed loop is established).

In another embodiment, when excess power is produced by generator 250 (i.e., when electrical assembly 208 requires more cooling than power), system controller 294 diverts high frequency AC power from generator 250 onto aircraft bus 304, with substantially no power quality detriment, thereby unloading generator 250 and isolating system 200 from aircraft bus 304, and power converter 300 conditions and/or synchronizes a high frequency electrical power produced by generator 250 for transmission to aircraft bus 304, resulting in a reduction of power diverted to resistive heater 302, a more efficient use of compressed air extracted from core engine 100, a lower temperature of air exhausted from system 200, and/or a reduction in electrical loading on a main generator (not shown) of the aircraft.

In another embodiment, system controller 294 adjusts a power diverted to resistive heater 302 based on a rotational speed of generator 250. In one embodiment, system controller 294 monitors a quantity of power diverted to resistive heater 302 and maintains a minimum bias power level on system 200. To protect against unloading of the main generator of the aircraft, system controller 294 continuously monitors an amount of power supplied by the main generator and compares the power supplied by the main generator to a minimum set point quantity of power to determine a maximum quantity of power that can be placed on aircraft bus 304. If the main generator power falls below the set point quantity of power, system controller 294 prevents diverting additional power from generator 250 to aircraft bus 304.

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate providing cooling and power. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

The methods and systems described herein facilitate providing cooling and power on an aircraft. Specifically, the methods and systems described herein facilitate optimizing a speed of a power turbine and a compressor to minimize fuel consumption by a propelling engine of the aircraft. Moreover, the methods and systems described herein facilitate optimizing a speed of a cooling turbine to maximize cooling efficiency and maintain a desired output of a generator. Additionally, the methods and systems described herein facilitate minimizing a space requirement that is necessary to accommodate a cooling and power system on an aircraft and facilitate minimizing a fuel cost associated with operating a cooling and power system on an aircraft.

Exemplary embodiments of methods and systems for providing cooling and power are described above in detail. The methods and systems for providing cooling and power as described herein are not limited to the specific embodiments described herein, but rather, components of the methods and systems may be utilized independently and separately from other components described herein. For example, the methods and systems described herein may have other industrial and/or consumer applications and are not limited to practice with an aircraft as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method for providing cooling and power, said method comprising:
   providing a cooling unit that includes a first turbine rotatably coupled to a generator by a first shaft;
   providing a power unit that includes a second turbine rotatably coupled to a compressor by a second shaft; and
   coupling the power unit in flow communication with the cooling unit to form a turbine assembly, wherein the first shaft and the second shaft are independently rotatable relative to one another.

2. A method in accordance with claim 1, further comprising coupling an electrical assembly to the turbine assembly, wherein the electrical assembly includes a system controller electrically coupled to the generator.

3. A method in accordance with claim 2, further comprising coupling a starter assembly in flow communication between the turbine assembly and a compressed air source, the starter assembly including a combustor.

4. A method in accordance with claim 3, wherein coupling a starter assembly in flow communication with the turbine assembly comprises coupling a mass flow device in flow communication with the turbine assembly, the mass flow device configured to regulate a mass flow through the power turbine.

5. A method in accordance with claim 3, further comprising coupling a cooling assembly in flow communication with the turbine assembly, the cooling assembly including a first air-to-air heat exchanger and a liquid-to-air heat exchanger.

6. A method in accordance with claim 5, wherein coupling a cooling assembly in flow communication with the turbine assembly comprises coupling a second air-to-air heat exchanger in flow communication with the first air-to-air heat exchanger and the liquid-to-air heat exchanger.

7. A method in accordance with claim 5, wherein coupling a cooling assembly in flow communication with the turbine assembly comprises providing a cooling circuit that extends through the liquid-to-air heat exchanger, at least a portion of the cooling circuit positioned proximate the electrical assembly.

8. A method in accordance with claim 7, wherein coupling an electrical assembly to the turbine assembly comprises electrically coupling a resistive heater to the generator such that the resistive heater is positioned along a flowpath of the cooling assembly.

9. A method in accordance with claim 1, wherein providing a cooling unit and providing a power unit comprise levitating the first shaft and the second shaft via magnetic bearings.

10. A method in accordance with claim 1, wherein coupling the power unit in flow communication with the cooling unit comprises coupling the first shaft to the second shaft via a magnetic coupler, wherein the magnetic coupler is selectively actuatable such that the first shaft and the second shaft are rotatable together.

11. A system for providing cooling and power, said system comprising:
   a turbine assembly that comprises:
      a cooling unit comprising a first turbine rotatably coupled to a generator by a first shaft; and
      a power unit comprising a second turbine rotatably coupled to a compressor by a second shaft, said power unit coupled in flow communication with said cooling unit such that said first shaft and said second shaft are independently rotatable relative to one another.

12. A system in accordance with claim 11, further comprising an electrical assembly that comprises a system controller electrically coupled to said generator.

13. A system in accordance with claim 12, further comprising a starter assembly coupled in flow communication between said turbine assembly and a compressed air source, said starter assembly comprising a combustor.

14. A system in accordance with claim 13, wherein said starter assembly further comprises a mass flow device configured to regulate a mass flow through said power turbine.

15. A system in accordance with claim 13, further comprising a cooling assembly coupled in flow communication with said turbine assembly, said cooling assembly comprising a first air-to-air heat exchanger and a liquid-to-air heat exchanger.

16. A system in accordance with claim 15, wherein said cooling assembly further comprises a second air-to-air heat exchanger coupled in flow communication with said first air-to-air heat exchanger and said liquid-to-air heat exchanger.

17. A system in accordance with claim 15, wherein said cooling assembly further comprises a cooling circuit that extends through said liquid-to-air heat exchanger, at least a portion of said cooling circuit positioned proximate said electrical assembly.

18. A system in accordance with claim 17, wherein said electrical assembly comprises a resistive heater electrically coupled to said generator, said resistive heater positioned along a flowpath of said cooling assembly.

19. A system in accordance with claim 11, wherein said turbine assembly further comprises a plurality of magnetic bearings, said first shaft and said second shaft magnetically levitated by said magnetic bearings.

20. A system in accordance with claim 11, wherein said turbine assembly further comprises a magnetic coupler positioned between said first shaft and said second shaft, said magnetic coupler selectively actuatable to couple said first shaft to said second shaft such that said first shaft and said second shaft are rotatable together.

* * * * *